W. HARLING.
STRAINER.
APPLICATION FILED JULY 21, 1913.
1,117,375.
Patented Nov. 17, 1914.
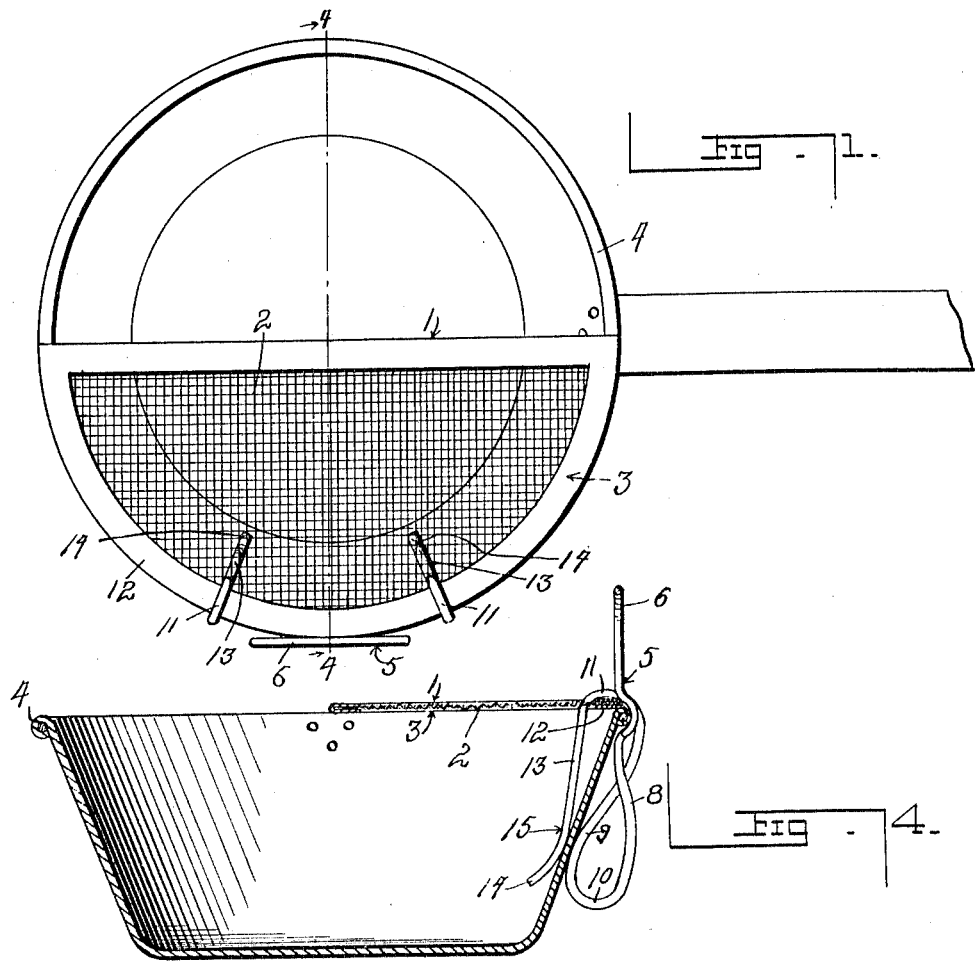
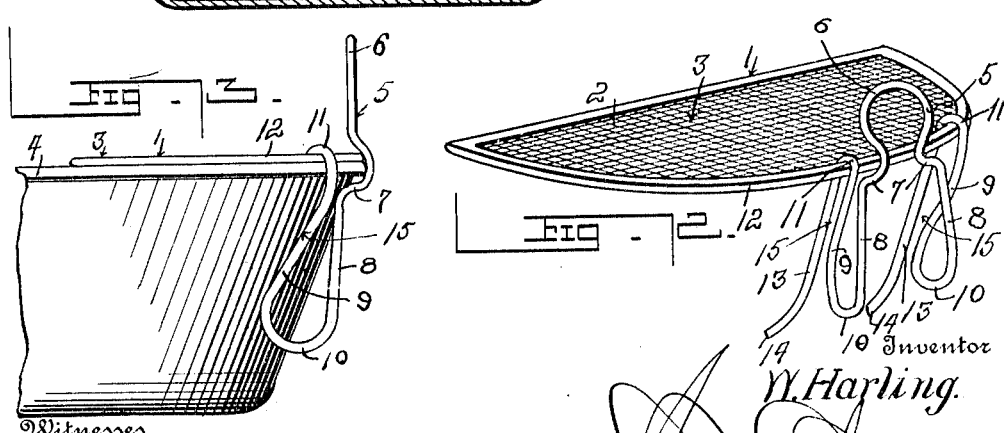
Witnesses
Roland T. Williams.
Walter B. Davis.
Inventor
W. Harling.
By
Attorney

UNITED STATES PATENT OFFICE.

WALTER HARLING, OF SEATTLE, WASHINGTON.

STRAINER.

1,117,375.   Specification of Letters Patent.   Patented Nov. 17, 1914.

Application filed July 21, 1913. Serial No. 780,342.

*To all whom it may concern:*

Be it known that I, WALTER HARLING, a citizen of the United States, residing at Seattle, in the county of King, State of Washington, have invented certain new and useful Improvements in Strainers; and I do hereby declare the following to be a full, clear, and exact description of the invention, such as will enable others skilled in the art to which it appertains to make and use the same.

This invention is directed to improvements in strainers, and has for its object to so construct the same that it can be easily and quickly attached to or removed from stew pans or similar utensils.

A further object of the invention is to so construct an article of this character that the same can be used in connection with pans of various sizes, and when in place thereon will permit the pans to be tilted so that the liquid will pass through the strainer and the articles cooked will be prevented from spilling.

With these and other objects in view, this invention resides in the novel features of construction, formation, combination and arrangement of parts to be hereinafter more fully described, claimed and illustrated in the accompanying drawing, in which:—

Figure 1 is a top plan view of the device showing the same attached to a stew-pan. Fig. 2 is a detail perspective view of the strainer. Fig. 3 is a side elevation of a pan showing the strainer in place thereon. Fig. 4 is a sectional view on line 4—4 of Fig. 1.

Referring to the drawing, the numeral 1 designates a semicircular frame, which is formed from sheet metal, and supports the wire mesh screen 2, thereby producing a strainer 3.

To hold the strainer 3 in place upon a pan, and in this instance being a conventional form of stew-pan having the marginal rim 4, a clamp 5 is provided, said clamp being formed from a single length of resilient wire bent intermediate its ends to form a loop 6 which has its lower ends formed with inwardly curved arms 7, said arms terminating in vertical arms 8, which in turn terminates in vertical arms 9, thus forming yoke like structures which constitute jaws 10.

The upper ends of the arms 9 terminate in loops 11, in which is engaged the curved section 12 of the frame 1, and which is soldered to said loops so as to rigidly connect the clamp to the strainer. The loops 11 terminate in downwardly extending arms 13 having their lower ends formed with downwardly inclined fingers 14, which serve as guides, said arms and fingers constituting jaws 15 for engaging the interior wall of the pan, and serve in conjunction with the jaws 10 to clampingly engage the pan so as to hold the strainer in proper relation thereto.

From this construction it will be seen that when it is desired to attach the strainer to the pan, that it is only necessary that the jaws 10 and 14 be engaged with the side of the pan, and at which time the curved arms 7 will engage under the rim 4, thus preventing the accidental disengagement of the jaws, which might result if the weight of the articles bearing against the strainer was excessive, during the straining operation.

The loop 6 serves as a finger piece to facilitate the attachment and removal of the strainer from the pan or the like.

What is claimed is:—

A clamp for securing a strainer to a receptacle comprising a continuous piece of resilient wire, a vertical loop formed midway between the ends thereof, the said loop terminating in off-sets arranged to engage the flange of the receptacle, arms projecting downwardly from said off-sets in the plane of the loop, the wire being then extended inwardly and upwardly so as to contact with the body of the receptacle, the wire then being bent outwardly and then inwardly so as to engage the edge of the receptacle, and downwardly extending arms arranged to engage the inner face of the receptacle.

In testimony whereof, I affix my signature, in the presence of two witnesses.

WALTER HARLING.

Witnesses:
J. T. HARLING,
JENNIE L. ANDERSON.

Copies of this patent may be obtained for five cents each, by addressing the "Commissioner of Patents, Washington, D. C."